United States Patent [19]
Wax et al.

[11] Patent Number: 6,104,344
[45] Date of Patent: Aug. 15, 2000

[54] EFFICIENT STORAGE AND FAST MATCHING OF WIRELESS SPATIAL SIGNATURES

[75] Inventors: Mati Wax, San Ramon; Sriram Jayaraman, Pleasanton; Vladimir Radionov, San Ramon; Gennadi Lebedev, Petaluma; Oliver Hilsenrath, Alamo, all of Calif.

[73] Assignee: US Wireless Corporation, San Ramon, Calif.

[21] Appl. No.: 09/275,655

[22] Filed: Mar. 24, 1999

[51] Int. Cl.$^7$ .................................. G01S 3/16; G01S 3/02
[52] U.S. Cl. ......................... 342/378; 342/451; 342/453
[58] Field of Search .................................... 342/457, 378, 342/450, 451, 453

[56] References Cited

U.S. PATENT DOCUMENTS

| | | | |
|---|---|---|---|
| 5,394,158 | 2/1995 | Chia | 342/457 |
| 5,959,574 | 9/1999 | Poore, Jr. | 342/96 |

OTHER PUBLICATIONS

Kamgar–Parsi, B. et al., *An improved branch and bound algorithm for computing k–nearest neighbors*, Pattern Recog. Let., 3, pp. 7–12, 1985.

Hashemi, H, "Pulse Ranging Radiolocation Technique and its Application to Channel Assignment in Digital Cellular Radio", IEEE Vehicular Tech Conf. May 1991, pp. 675–680.

Jeng, S.S. et al, "Measurements of Spatial Signature of an Antenna Array", 6th International Symposium on Personal, Indoor and Mobile Radio Communications, PIMRC '95. pp. 669–672.

*Primary Examiner*—Gregory C. Issing
*Attorney, Agent, or Firm*—Lumen Intellectual Property Services

[57] ABSTRACT

A method for determining a geographical location from a measured wireless signal signature comprises calculating from the measured wireless signal signature a multi-dimensional signature vector, wherein each component of the vector measures a degree of coincidence between the measured wireless signal signature and a calibrated signal signature stored in a calibration table. The method also includes matching the signature vector with vectors in a set of multi-dimensional calibrated vectors. The matching uses a procedure comprising searching a hierarchical tree structure and eliminating nodes that cannot contain the best match vector. Within the remaining nodes, the search eliminates individual vectors that cannot be the best match vector, and selects one or more vectors in the set of multi-dimensional calibrated vectors, where the matched vectors correspond to calibrated geographical locations.

8 Claims, 3 Drawing Sheets

EFFICIENT STORAGE AND FAST MATCHING OF WIRELESS SPATIAL SIGNATURES

This application is related to U.S. patent application Ser. No. 09/064,649 filed Apr. 22, 1998, which is incorporated herein by reference.

FIELD OF THE INVENTION

This invention relates generally to methods for determining the location of mobile radio transmitters. More specifically, it relates to efficient methods for searching and storing compact tables of location information and associated signal signature information.

BACKGROUND

Known techniques for determining in real time the location of a cellular phone are based upon techniques such as direction finding (DF), time of arrival (TOA), and time difference of arrival (TDOA). These techniques, however, cannot accurately and reliably locate transmitters in severe multipath environments. An alternate approach to the location determination problem is disclosed by Hilsenrath et al. in U.S. patent application Ser. No. 08/780,565 now U.S. Pat. No. 6,026,304 (which is not admitted to be prior art with respect to the present invention by its mention in this Background section). This alternate approach, which takes advantage of multipath signals rather than attempting to mitigate or avoid them, measures a signal signature and determines a location by matching the signature with a calibrated database of signature-location pairs. In other words, rather than calculating a location from the measured signal signature, the location is determined by matching the signature with a calibrated signature in a database of known signature-location pairs.

An important step in practicing the above location-finding method involves generating, storing, and searching the database of calibrated signatures and associated locations. Jayaraman et al. in U.S. patent application Ser. No. 09/064,649 (which is not admitted to be prior art with respect to the present invention by its mention in this Background section) discloses a method for generating such a calibration table. In order to conserve data storage resources and improve the speed and efficiency of the location finding process, it is desirable to generate a compact and optimal signature-location database that may be quickly searched.

OBJECTS AND ADVANTAGES OF THE INVENTION

Accordingly, it is a primary object of the present invention to provide a method for generating a compact and optimal signature-location database from data collected from vehicles following multiple trajectories. It is a further object of the invention to provide a method for compressing a signature-location database derived from data collected from such vehicles. Yet another object of the invention is to provide a method for quickly searching such a compressed database for a location whose signature matches a measured signature. These and other objects and advantages of the present invention will become apparent from the following description and associated drawings.

SUMMARY OF THE INVENTION

In one aspect of the invention, a method is provided for determining a geographical location from a measured wireless signal signature. The method comprises calculating from the measured wireless signal signature a multi-dimensional signature vector, wherein each component of the vector measures a degree of coincidence between the measured wireless signal signature and a calibrated signal signature stored in a calibration table. The method also includes matching the signature vector with vectors in a set of multi-dimensional calibrated vectors. The calibrated signatures are organized by a precomputed hierarchical tree structure. The measured signature vector is matched to the calibrated signature vectors in the tree using a branch and bound search procedure. This procedure efficiently determines one or more vectors in the set of multi-dimensional calibrated vectors, where the matched vectors correspond to calibrated geographical locations. In another aspect of the invention, a method is provided for generating a compact calibration table comprising wireless signal signatures and corresponding geographical locations. The method comprises collecting wireless signal and location data corresponding to points along a plurality of geographical routes; creating a total calibration table from the data; and compressing the total calibration table to produce a compact calibration table.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

The preferred embodiment of the present invention will be described within the context of a wireless phone location system comprising a collection of base stations and mobile handsets. An example of such a system is disclosed by Hilsenrath et al. in U.S. patent application Ser. No. 08/780,565. Other systems, however, are also compatible with the present invention, and will benefit from the techniques disclosed herein. Generally, the present invention is applicable to any system for generating calibration tables that is based on the measurement of wireless signal parameters and corresponding location information. The signal parameters may comprise, alone or in combination, DF information, TOA information, TDOA information, channel covariance matrix information, or other signal information derived from one or more base stations. The location information may comprise, alone or in combination, satellite-based positioning data, dead reckoning data, or other data derived from known navigational or positioning methods.

Figure 1:
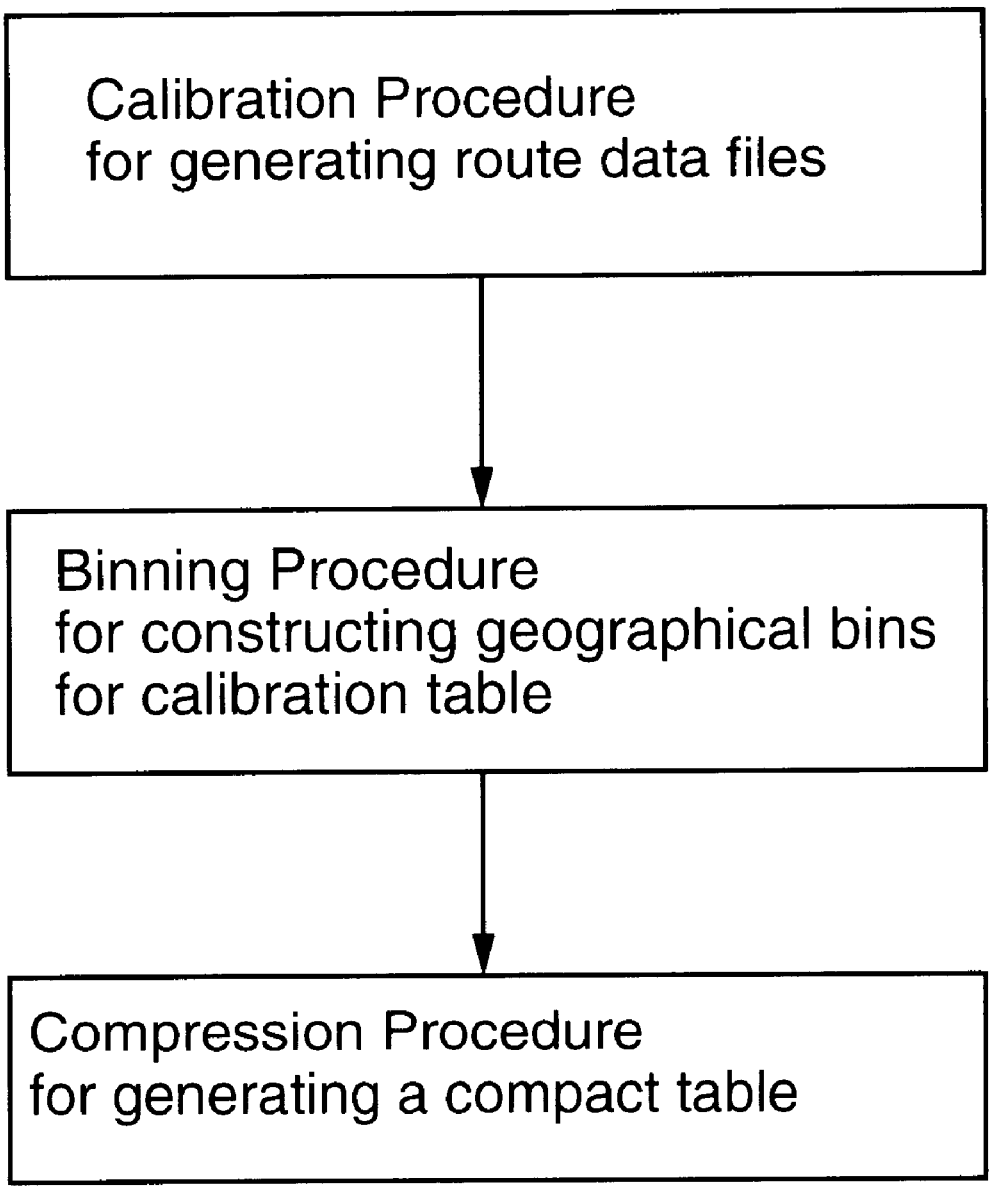
FIG. 1 is a flow chart outlining steps of a preferred embodiment of the invention.

FIG. 1 illustrates three aspects of the preferred embodiment: a calibration procedure for generating route data files from wireless signals and GPS location data, a binning procedure for constructing geographical bins of the calibration table, and a compression procedure for generating a compact calibration table. These steps will now be described separately in detail.

In a calibration procedure according to the present invention, a calibration vehicle follows an arbitrary trajectory within a service region of a base station. The vehicle contains a cellular handset transmitting on a predetermined frequency channel, and also contains a GPS receiver and a computer for storing the real-time GPS position data of the vehicle along its trajectory. In a typical calibration procedure, the GPS location data along the trajectory are periodically stored together with the GPS clock time-stamp, typically at intervals on the order of 100 ms. Meanwhile, the transmitted signal from the cellular phone is received at an antenna array of the base station, which is also equipped with a GPS receiver, and the signal signature is computed and stored with the GPS clock time stamp. When the data from the vehicle and the base station are combined and processed, differential GPS correction data obtained from the base station are used to determine with high accuracy the vehicle location r corresponding to each signature. The signature is obtained by coherently sampling complex-valued signals from p antennas over a 100 ms interval at a base station, and calculating from the signals a pxp signal covariance matrix C. In a typical embodiment, the antenna antenna array has six antennas (i.e., p=6) arranged in three pairs, where each pair is associated with one of three spatial sectors. The signal signature and location information is then stored as raw calibration data at the base station.

Note that the calibration procedure may include the simultaneous use of several base stations and/or several vehicles moving within the service area. In addition, each vehicle may include several phones operating on different frequencies. For example, a set of 6 phones in a vehicle may be used to transmit at frequency intervals of 2 MHz in order to provide the signature data with frequency coverage across a 10 MHz bandwidth. In this case, the p-channel coherent receiver scans the 6 frequencies sequentially in a period of about 100 ms, i.e., sampling each frequency for about 16 ms. The raw calibration data then contains 6 signatures corresponding to the 6 frequencies for each location along the vehicle trajectory. It will also be appreciated that the location data may be derived from techniques other than, or in addition to, GPS techniques. For example, the GPS location information can be supplemented by dead reckoning or other navigational information. Such supplementary location information is especially useful in cases where GPS reception is poor. The supplementary location information can be stored with the GPS information and post-processed in an off-line procedure as described above. Alternatively, the location information can be transmitted in real time to the base station during the calibration procedure.

Figure 2A:
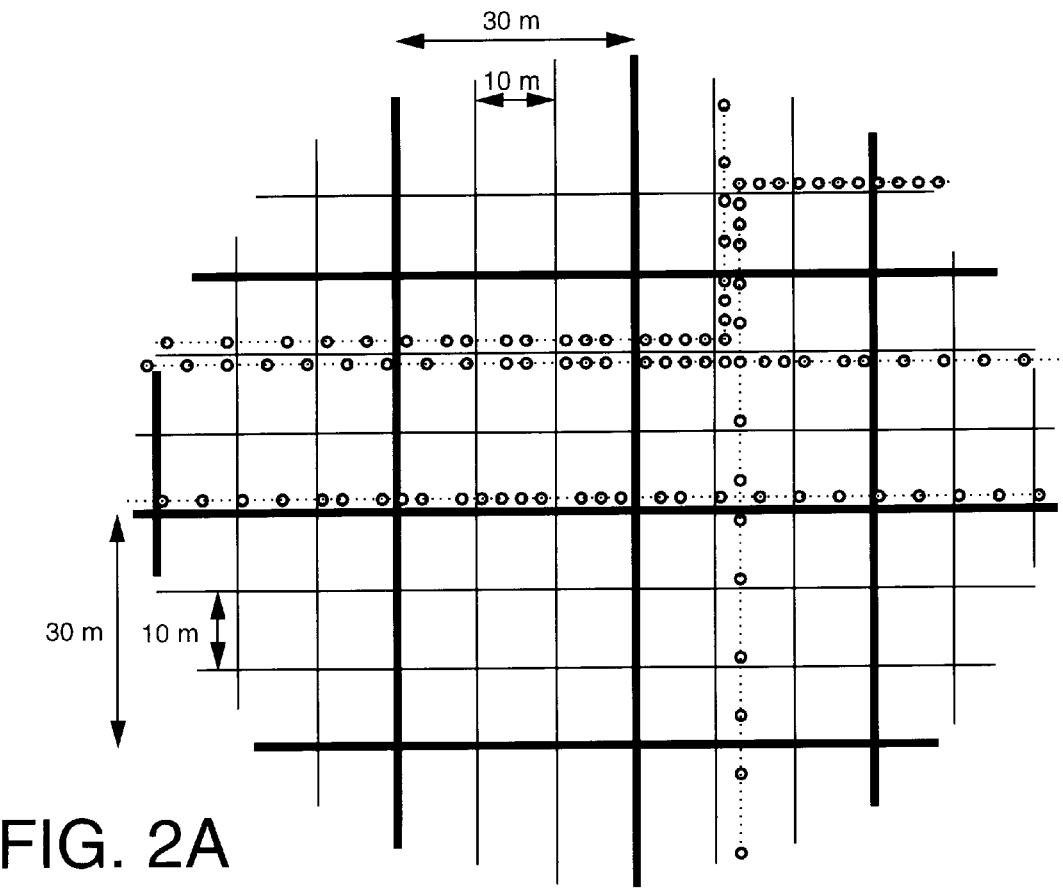
FIGS. 2A and 2B illustrate sub-bins and bins used in a calibration table generation and compression technique according to a preferred embodiment of the invention.

Typically, the calibration procedure will use one or more vehicles following M routes at the same or different times to produce M respective sets of raw calibration data. FIG. 2A shows several routes, indicated by dotted lines, as well as the data points along each route, indicated by small circles along the lines. The raw data contains redundancy due primarily to arbitrary and uncontrolled vehicle speeds and/or trajectories. A stopped or very slow moving vehicle, for example, results in many redundant data points corresponding to nearly the same location. Overlapping route trajectories also result in redundant data points. These redundancies are removed in the compression step in order to generate an optimal calibration table from this raw data.

The raw data collected from M routes is stored in a set of M files, which are also represented by $t_1, \ldots, t_M$. Each file $t_m$ contains a set of covariance matrices $c=\{C_1, \ldots, C_{N(m)}\}$ and a set of N(m) corresponding locations $r=\{r_1, \ldots, r_{N(m)}\}$, where N(m) is the number of data points in route m. These temporally sequential lists are conveniently represented as a single list of ordered pairs $(C_1,r_1), \ldots, (C_{N(m)},r_{N(m)})$. Each data point, therefore, may be assigned a unique index pair (m,n), where m=1, ..., M specifies the route and n=1, ..., N(m) specifies the data point within the route, as shown in Table 1.

TABLE 1

| Route 1 | Route 2 | ... | Route m | ... | Route M |
|---------|---------|-----|---------|-----|---------|
| (1,1)   | (2,1)   |     | (m,1)   |     | (M,1)   |
| (1,2)   | (2,2)   |     | (m,2)   |     | (M,2)   |
| :       | :       |     | :       |     | :       |
| (1,n)   | (2,n)   | ... | (m,n)   | ... | (M,n)   |
| :       | :       |     | :       |     | :       |
| (1,N(1))| (2,N(2))|     | (m,N(m))|     | (M,N(M))|

Note that each route m will usually have a different number of data points N(m). The columns of Table 1, therefore, do not necessarily have the same number of rows.

Figure 2B:
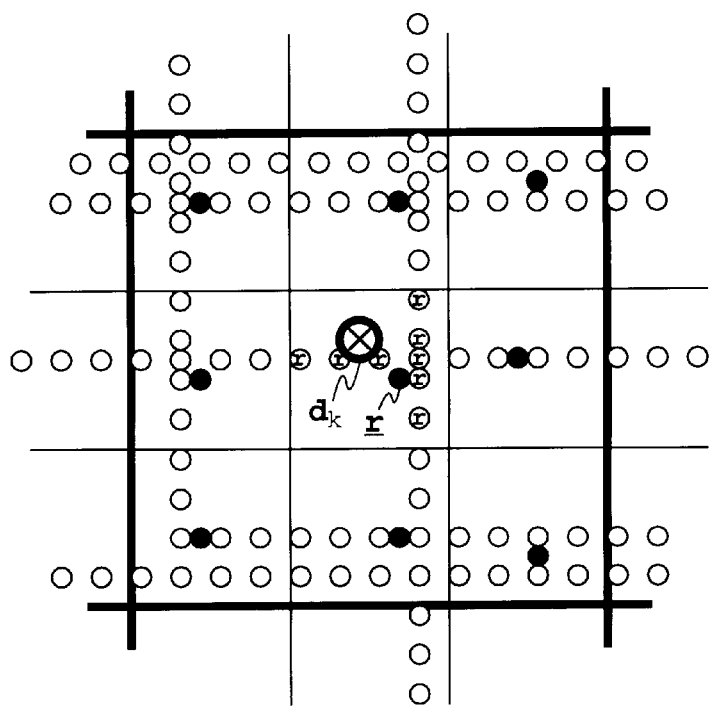

The raw data from all the routes is organized and compressed into geographical bins. To each bin is assigned a unique bin covariance R representative of the covariances C measured within that bin, and a bin location d representative of the geographical locations r within the bin. The binning procedure includes three steps, which will be described below in relation to FIGS. 2A and 2B. In the first step, the base station's coverage area is divided into bins, each of which is divided into sub-bins. The size and shape of the bins may vary according to the environment and distance from the base station. In the preferred embodiment, the bins are squares whose size may vary from 30 m in urban areas to 100 m in rural areas. The size and shape of the sub-bins is determined by the location information error. In the case of GPS with differential correction, the sub-bins are squares whose size is about 10 m. In the second step, for each sub-bin an average C of the covariance matrices C whose locations r are within the sub-bin is calculated, together with a centroid r of their locations. In the third step, the same procedure is repeated for the bins. That is, for each bin k an average $R_k$ of the sub-bin covariances C belonging to the bin is calculated, together with a centroid $d_k$ of the sub-bin locations r in the bin. In addition, a bin signature $U_k$ is calculated from $R_k$. In the preferred embodiment, this signature is the subspace spanned by the dominant eigenvectors of $R_k$. Alternatively, the covariance matrix $R_k$ can itself serve as the signature for bin k.

The calibration table database comprises a set of calibrated bin signatures $\mathcal{U}=\{U_1, \ldots, U_N\}$ stored along with the associated set of bin locations $\mathcal{D}=\{d_1, \ldots, d_N\}$. In addition, the bin God covariances $\mathcal{R}=\{R_1, \ldots, R_N\}$ may be included in the database as well. Typically, the total number of bins N is on the order of 10,000. This table may then be used in a system for location finding by measuring a signal covariance R from a transmitter whose location is unknown, comparing the signal covariance with the signatures stored in the calibration table, and selecting one or more likely locations that yield the best match. In a preferred embodiment, distinct calibration tables are constructed for various different frequency bands in use, e.g., one calibration table for each 2-4 MHz band of frequency channels. Thus, the calibration table used to derive a location will be selected in dependence upon the frequency of the signal.

Various techniques may be used for matching the measured signature with the calibrated signatures in the table. In one technique for real-time location finding, the covariance matrix R is compared with the calibrated signal subspaces $\mathcal{U}=\{U_1, \ldots, U_N\}$ by first evaluating a function $L_R$ at each location index i, $$L_R(i)=\text{Tr}\{P_iR\}=\text{Tr}\{U_iU_i^H R\},$$

where $P_i=U_iU_i^H$ is the projector onto the subspace $U_i$. The value of $L_R(i)$ measures the degree to which the measured signal covariance R coincides with the ith calibrated subspace $U_i$, and represents the likelihood that the mobile is at bin location $d_i$. Thus, a set $\mathcal{D}$ of likely locations can be selected by taking those locations $d_i$ in $\mathcal{D}$ such that the projection of the signal covariance R upon the corresponding subspace $U_i$ in $\mathcal{U}$ is greater than a certain predetermined threshold value T. That is, $$\mathcal{D}'=\{d_i \text{ in } \mathcal{D} \text{ such that } L_R(i)>T\}.$$

This set $\mathcal{D}'$ of likely locations corresponds to a set $\mathcal{U}'$ of likely calibrated subspaces:

$$\mathcal{U}'=\{U_i \text{ in } \mathcal{U} \text{ such that } L_R(i)>T\},$$

and a set $\mathcal{R}'$ of likely calibrated covariance matrices:

$$\mathcal{R}'=\{R_i \text{ in } \mathcal{R} \text{ such that } L_R(i)>T\},$$

A more subtle technique for identifying likely locations is as follows. Recall that the function $L_R$ represents how signal covariance R compares to the entire collection of N calibrated signatures $\mathcal{U}$. Now consider the set of N functions $L_{R_1}, \ldots, L_{R_N}$, where $L_{R_k}(i)=\text{Tr}\{P_i R_k\}$. These N functions represent how each of the calibrated covariance matrices $R_1, \ldots, R_N$ compares to the collection of calibrated subspaces in $\mathcal{U}$. Now consider each function $L_{R_k}$ as an N-dimensional vector $v_k$ whose $i^{th}$ component is $L_{R_k}(i)=\text{Tr}\{P_iR_k\}$, i.e., $v_k=[L_{R_k}(1), \ldots, L_{R_k}(N)]^T$. Similarly, consider the function $L_R$ as an N-dimensional vector $v=[L_R(1), \ldots, L_R(N)]^T$. The most likely locations can now be determined by comparing the vector v with each of the vectors $v_1, \ldots, v_N$. A likely location should be a location $d_k$ whose corresponding vector $v_k$ is close, with respect to some statistical metric D, to v. For example, a metric D which measures the distance between vectors can be defined by the squared difference, $$D(v_k,v)=\|v_k-v\|^2,$$

or, alternatively, by the Kullback-Liebler distance. Those skilled in the art will appreciate that many other metrics can also be used to achieve a similar result.

The above technique is advantageous and reduces location ambiguity because the comparison between the vectors v and $v_k$ includes comparative information from all N components of the vectors, rather from single components. Thus, more information is used to compare the measured signal covariance with the calibrated subspaces, and a more accurate match can be obtained.

The actual location is selected to be the location $d_k$ for which $D(v_k,v)$ is the smallest. Alternatively, several likely locations can be selected, where the value of D for these locations is small. In particular, a set of likely locations $\mathcal{D}'$ can be defined as the locations in $\mathcal{D}$ whose corresponding vectors $v_k$ are closest to v in the sense of D. Alternatively, $\mathcal{D}'$ can be defined as those locations in $\mathcal{D}$ whose corresponding vectors $v_k$ are within a certain predetermined distance H (in the sense of D) to v. That is, $$\mathcal{D}'=\{d_k \text{ in } \mathcal{D} \text{ such that } D(v_k,v)<H\}.$$

In order to provide a fast real-time location finding system, the set of vectors $v_1, \ldots, v_N$ is preferably calculated in advance and stored as part of the calibration table. The size of the calibration table is proportional to $N^2$. With values of N as large as 10,000, for example, each of the 10,000 vectors will have 10,000 components, resulting in a total of 100,000,000 values required to store the set of vectors. As for search time, the time required to compare the vector v with this set of vectors is proportional to N. Accordingly, the present invention provides techniques for generating and searching a more compact calibration table. These techniques reduce the required data storage space as well as the time required to search the database during real-time location-finding.

A database compression and matching technique according to one embodiment of the present invention is provided as follows. As before, define $v_k=[L_{R_k}(1), \ldots, L_{R_k}(N)]^T$, where $L_{R_k}(i)=\text{Tr}\{P_iR_k\}$. It can be shown that $\text{Tr}\{P_iR_k\}=p_i^Tr_k$, where $p_i$ is a $p^2$-dimensional vector derived from $P_i$, and $r_k$ is a $p^2$-dimensional vector derived from $R_k$. Moreover, both $p_i$ and $r_k$ have real-value components. Thus, $v_k=[p_1^Tr_k, \ldots, p_N^Tr_k]^T$. Similarly, $v=[p_1^Tr, \ldots, p_N^Tr]^T$, where r is a $p^2$-dimensional vector derived from R.

With these simplified representations of v and $v_k$, the closeness of the measured signature and a calibrated signature k can be calculated, as before, with the metric $D(v,v_k)=\|v-v_k\|2$. The calculation of this measure, however, requires all N components of the vectors to be computed. It is desirable, therefore, to simplify the calculation of D. One such technique for simplifying the calculation of D is as follows. Define the matrices $P^T=[p_1^T \ldots p_N^T]$ and $R=[r_1 \ldots r_N]$. It can then be shown that the N×N calibration table matrix $V=[v_1 \ldots v_N]$ is given by V=P R, and that $$D(v, v_k)=\|v_k-v\|^2$$

$$=\|Pr_k-Pr\|^2$$

$$=\|Gr_k-Gr\|^2,$$

where $G^TG$ is the Cholesky factorization of $P^TP$. Since G is a $p^2 \times p^2$ square matrix, and since both $r_k$ and r are $p^2$-dimensional vectors, it is very simple to store G and $Gr_k$, and to compute $D(v,v_k)=\|G\ r_k-G\ r\|^2$. In a typical embodiment, with p=6 and N=10,000, this technique provides more than two orders of magnitude savings in storage and computation.

A more general compression and matching technique according to the present invention is based on the following method, which is applicable to more general likelihood functions (i.e. functions that are not necessarily linear). Perform a singular value decomposition (SVD) of the calibration table matrix $V=[v_1 \ldots v_N]$. Typically, the SVD of this matrix will have an effective rank dramatically smaller than N. For example, typically only about 100 statistically significant dominant eigenvectors result from an SVD of a matrix V with N=10,000. These dominant eigenvectors span a subspace $V_s$ of the matrix V. The projector onto this subspace is $P_{v_s}=V_sV_s^H$. Now calculate $v=V_s^Hv$ and $v_k=V_s^Hv_k$ for k=1, \ldots, N. The vector v is the projection of the N-dimensional vector v onto the subspace spanned by the dominant eigenvectors of V. Similarly, vector $v_k$ is the projection of the N-dimensional vector $v_k$ onto the same subspace. The dimension of this subspace is typically two orders of magnitude smaller than N. Consequently, the vectors v and $v_k$ also have dimension two to three orders of magnitude less than N. Yet, because the other dimensions may be neglected, no significant information is lost by replacing the original N-dimensional vectors by these lower-dimensional vectors. Consequently, the size of the calibration table can be reduced by more than two orders of magnitude by storing these reduced vectors rather than their N-dimensional counterparts.

The matching of the vector v with vectors in the set of N vectors $v_1 \ldots, v_M$ is performed by evaluating $D(v,v_k)$ for $k=1, \ldots, N$. It can be seen, however, that $$D(v,v_k)=\|v-v_k\|^2 \approx \|v_sv-v_sv_k\|^2=\|v-v_k\|^2.$$

Thus, the compact vectors v and $v_k$ can be used directly in the real time calculation, rather than the original vectors. Because the dimension of v and $v_k$ are much smaller than the dimension of v and $v_k$, the storage requirements are much smaller and the calculation speeds are much faster.

As was shown above, the N computed values of D $(v, v_k)$ are used to select one or more likely locations for the mobile. Another approach to determining a set of likely locations is to consider the topographical structure of the surface defined by z $S(x,y)$, where S is defined at bin location points $(x_k, y_k)=d_k$ by $S(x_k, y_k)=D(v, v_k)$. The locations corresponding to the minima of this surface S should be the most likely locations of the mobile. A systematic search or other analysis of the surface can be used to produce a small set of locations corresponding to distinct minima of the surface. The best match corresponds to the least of these minima. Searching the entire N-point surface, however, can be computationally complex, especially when D is calculated at each location. The present invention, therefore, also provides the following technique for more efficiently searching the calibrated signatures for the best match.

Figure 3:
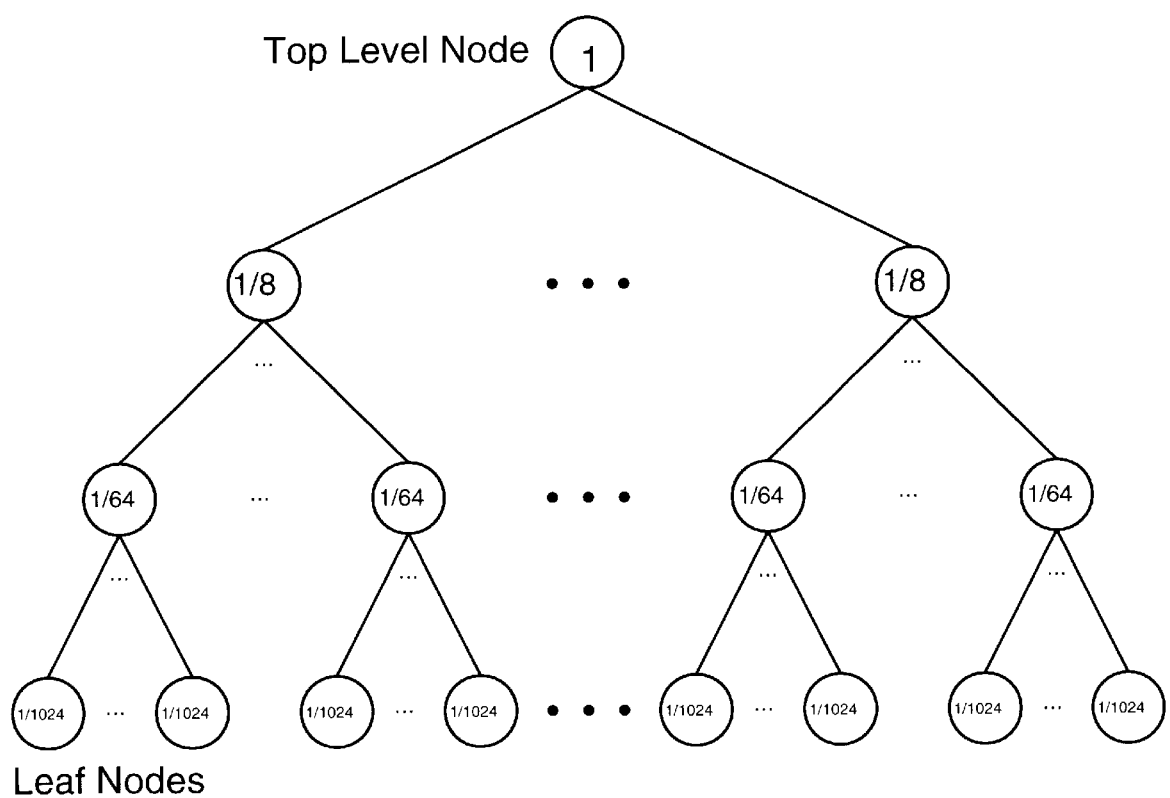
FIG. 3 illustrates a hierarchical tree structure that is used to organize a calibration table and to improve the searching efficiency according to a preferred embodiment of the invention.

According to one embodiment of the invention, a hierarchical tree structure is associated with the set of N calibrated locations, as illustrated in FIG. 3. The tree structure is composed of a number of nodes, each (except for the top node) connected to one higher level node and each (except the bottom nodes) connected to a number of lower level nodes. In a preferred embodiment, there are 4 to 16 branches des ending from each node, and 3 to 6 levels of nodes. FIG. 3 illustrates an example in which there are 8 branches from each node, and 4 levels of nodes. The leaf nodes of the tree at the bottom level have no lower level nodes. Using well-known data clustering methods, each signature vector is assigned to one leaf node at the lowest level of the tree. Typically, each leaf node contains to 10 to 30 signature vectors and their corresponding locations. A node at the second-lowest level contains the union of the points contained in the lower-level nodes connected to it. A similar relationship holds between other nodes in the tree. Thus, the highest node contains all N signature vectors in the calibration table, while the second-highest nodes contain (not-necessarily disjoint) subsets of these N vectors. In addition, each node q has associated with it a mean vector $v_{av}(q)$ calculated by averaging all the vectors $v_k$ corresponding to locations in the node q, and node parameters $$D_{max}(q)=\max\{D(v_{av}(q),v_k) \text{ such that } v_k \text{ is in node } q\},$$

$$D_{min}(q)=\min\{D(v_{av}(q),v_k) \text{ such that } v_k \text{ is in node } q\}.$$

Each leaf node also has associated with it a set of precomputed distances $D(v_i,v_j)$, for all pairs $v_i,v_j$ in the node such that i>j.

Using this hierarchical tree-structure and associated data, which is all computed when the calibration table is initially generated, the process of searching the calibration table for a matching signature is made much more efficient. In the preferred embodiment, the tree search procedure used in the first phase of the matching is an adaptation of the well-known branch and bound algorithm, which traverses the tree and efficiently eliminates all nodes from the search that cannot contain the best match. The elimination of nodes from the search is guided by the following rule. A node q is eliminated if either $B+D_{max}(q)<D(v, v_{av}(q))$ or if $B+D(v, v_{av}(q))<D_{min}(q)$, where B is the distance from v to the best matching vector among the vectors considered thus far in the tree.

Once a leaf node is reached, an efficient search technique is used to perform the matching within the node. In this technique, the precomputed values $D(v_i,v_j)$ for the node are used to quickly eliminate vectors within the node. Note that the storage requirement for the precomputed distances $D(v_i, v_j)$ is quadratic in the number of points in the leaf node. Consequently, the number of points in the leaf nodes is preferably kept small in order to minimize storage requirements. In the preferred embodiment, the number of points in a leaf node is typically between 10 and 30. The elimination of points from the search process within a leaf node q is performed using the following rule. A location $d_k$ is eliminated if $B+D(v_k, v_{av}(q))<D(v, v_{av}(q))$ or if $B+D(v, v_{av}(q))<D(v_k, v_{av}(q))$ or if $|D(v_s, v_k)-D(v_s,v)|>B$, where B is the distance from v to the best match among the set of vectors considered so far in the tree, and where s indexes a special point $d_s$ selected within the leaf node. Note that this rule does not require any new distance computations beyond the single distance $D(v_s,v)$. Thus, to quickly eliminate as many points as possible, it is important to choose $d_s$ so that the distance between $v_s$ and v is small. In the preferred embodiment, the index s for $d_s$ is determined by the following approximation criterion:

$$s=\arg \min_s \max_k\{\|D(v_s,v_k)-D(v_s,v)\|^2\},$$

or $$s=\arg \min_s\{\Sigma_k\|D(v_s,v_k)-D(v_s,v)\|^2\},$$

where the maxk and the $\Sigma_k$ are evaluated over all indices k corresponding to points considered so far in the node, and the arg min function ranges over all indices corresponding to points not considered yet in the node. This process of point elimination is continued until all the points in the leaf have been either eliminated or considered.

It should be noted that this efficient matching procedure can be easily extended to search for a multiple number of best locations. Alternatively, it can be extended to search for a set of likely locations that satisfy various other criteria. For example, one criterion for a likely location $d_k$ is that $D(v_k, v)<\alpha B$, where B is the distance to the best match and $\alpha$ is a constant greater than 1.

What is claimed is:

1. In a wireless location finding system, a computer-implemented method for determining a geographical location from a measured wireless signal signature, the method comprising:

calculating from the measured wireless signal signature a multi-dimensional vector v, wherein each component of v measures a degree of coincidence between the measured wireless signal signature and a calibrated signal signature stored in a calibration table;

matching v with matched vectors in a set of multi-dimensional calibrated vectors $v_1, \ldots, v_N$, using a procedure comprising searching a hierarchical tree structure containing the calibrated vectors $v_1, \ldots, v_N$, and selecting the matched vectors from leaf nodes in the tree, where the matched vectors correspond to calibrated geographical locations.

2. The method of claim 1 wherein the calibrated signal signature stored in the calibration table comprises a calibrated bin covariance matrix R calculated from covariances measured within a geographical bin.

3. The method of claim 2 wherein the bin covariance matrix R is an average of sub-bin covariance matrices calculated from covariance matrices measured in sub-bins of the geographical bin.

4. The method of claim 1 wherein each vector $v_k$ in the set of multi-dimensional calibrated vectors $v_1, \ldots, v_N$ is calculated from $v_k = [p_1^T r_k, \ldots, p_N^T r_k]^T$, where $r_k$ is a $p^2$-dimensional vector derived from a calibrated signal covariance matrix $R_k$ and $p_i$ is a $p^2$-dimensional vector derived from a calibrated signal signature.

5. The method of claim 1 wherein searching the hierarchical tree structure comprises using a branch and bound technique to eliminate from the tree structure nodes not containing a best matched vector.

6. The method of claim 1 wherein searching the hierarchical tree structure comprises using precomputed distances between vectors in a leaf node to eliminate from the leaf node vectors not possibly being a best matched vector.

7. The method of claim 6 wherein searching the hierarchical tree structure further comprises representing v and a vector $v_k$ in the leaf node by lower-dimensional vectors r and $r_k$, respectively, and calculating a difference between G $r_k$ and G r, where $G^T G$ is the Cholesky factorization of $P^T P = [p_1^T \ldots p_1^T \ldots p_N^T]^T$, and where $p_1, \ldots, p_N$ are N-dimensional vectors derived from calibrated subspaces.

8. The method of claim 7 wherein searching the hierarchical tree structure further comprises projecting v and a vector $v_k$ in the leaf node onto a subspace of a calibration table matrix, wherein the subspace is spanned by a set of dominant eigenvectors of the calibration table matrix, and calculating a difference between the projected vectors.

* * * * *